United States Patent [19]

Föhl

[11] Patent Number: 4,846,498
[45] Date of Patent: Jul. 11, 1989

[54] SAFETY BELT RESTRAINING SYSTEM FOR VEHICLE OCCUPANTS

[75] Inventor: Artur Föhl, Schorndorf, Fed. Rep. of Germany

[73] Assignee: TRW Repa GmbH, Alfdorf, Fed. Rep. of Germany

[21] Appl. No.: 171,944

[22] Filed: Mar. 23, 1988

[51] Int. Cl.$^4$ ............................................. B60R 22/32
[52] U.S. Cl. ................................... 280/808; 297/468; 297/483
[58] Field of Search ............... 280/801, 804, 808, 802; 297/468, 469, 483, 484

[56] References Cited

U.S. PATENT DOCUMENTS

| | | | |
|---|---|---|---|
| 4,538,832 | 9/1985 | Anderson | 280/808 |
| 4,652,012 | 3/1987 | Biller et al. | 280/808 |
| 4,684,153 | 8/1987 | Miller | 280/808 |
| 4,702,494 | 10/1987 | Escaravage | 280/808 |
| 4,711,498 | 12/1987 | Adomeit | 280/808 |

FOREIGN PATENT DOCUMENTS

| | | |
|---|---|---|
| 1152907 | 8/1963 | Fed. Rep. of Germany . |
| 2622556 | 12/1977 | Fed. Rep. of Germany . |
| 2651037 | 5/1978 | Fed. Rep. of Germany . |
| 2655015 | 6/1978 | Fed. Rep. of Germany . |
| 2657819 | 6/1978 | Fed. Rep. of Germany . |
| 2942879 | 4/1981 | Fed. Rep. of Germany . |
| 3426551 | 5/1985 | Fed. Rep. of Germany . |

Primary Examiner—Richard A. Bertsch
Attorney, Agent, or Firm—Tarolli, Sundheim & Covell

[57] ABSTRACT

In the safety belt restraining system a tightening means is combined with a height adjuster for the upper deflection fitting of the shoulder belt. By offsetting of the pivot axis of the detent lever of the height adjuster in the forward direction with respect to the engagement point of the deflection fitting, on activation of the tightening means a turning moment is generated at the detent lever by which said lever is pivoted into engagement with the next available detent opening of the height adjuster.

10 Claims, 2 Drawing Sheets

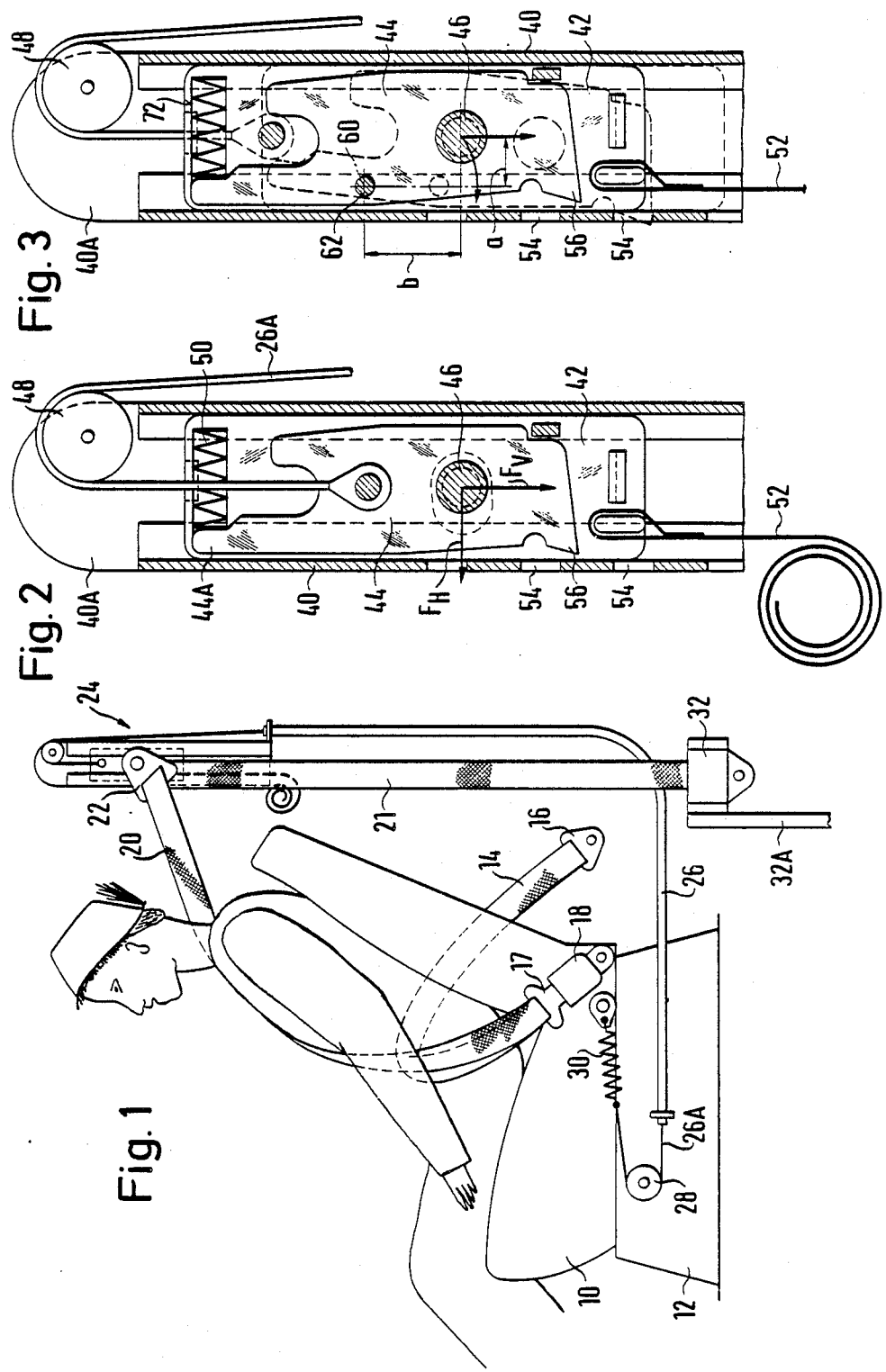

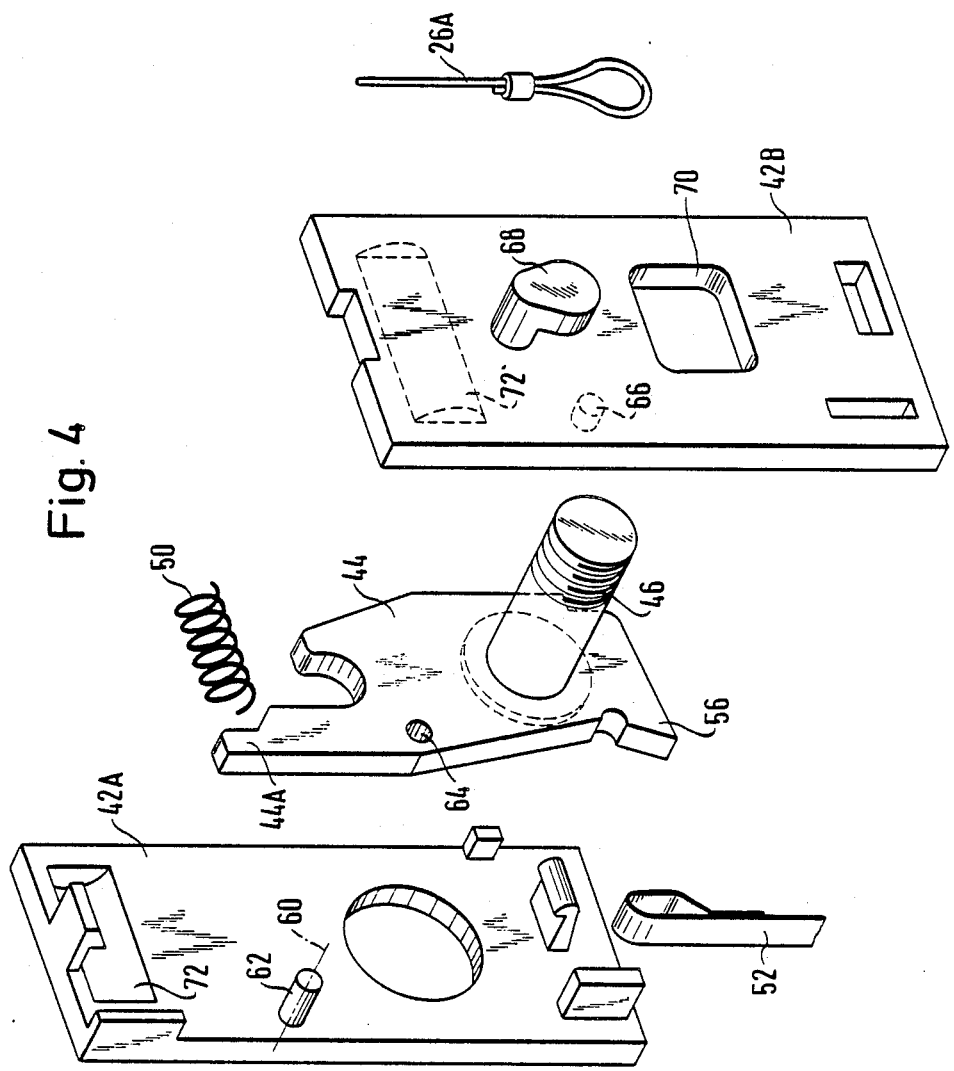

SAFETY BELT RESTRAINING SYSTEM FOR VEHICLE OCCUPANTS

The invention relates to a safety belt restraining system for vehicle occupants. Such safety belt restraining systems for vehicle occupants generally include a safety belt retractor with automatic blocking means. It is known from German specification as laid open to inspection No. 3,131,637 to equip such a safety belt retractor with a tightening means. The tightening means is initiated by a deceleration sensor and by rotation of the belt spool of the safety belt retractor in the takeup direction effects a tightening of the safety belt on the vehicle occupant to eliminate any belt slack. The tightening of the safety belt must take place within an extremely short period of time of only about 8 to 12 milliseconds.

It is further known from German patent No. 2,622,556 in a three-point safety belt to make the upper deflection fitting of the shoulder belt height adjustable to adapt the height of the deflection fitting in optimum manner to the size of the vehicle occupant. The height adjustment of the deflection fitting is related to the longitudinal adjustment of the vehicle seat because the longitudinal position of the vehicle seat also depends on the size of the vehicle occupant. The upper deflection fitting of the safety belt is secured to a guide-piece which is desplaceable in a vertical guide rail. The guide-piece comprises a pawl which cooperates with a locking rail which comprises detent openings and which extends parallel to the guide rail at a slight distance from the latter. The pawl whereon the deflection fitting is mounted is held by a spring out of engagement with the detent openings of the detent rail. When the safety belt is tensioned under load, the pawl is brought into engagement with the next available detent opening of the locking rail so that no undesired downward movement of the upper deflection fitting takes place.

So far it was not possible to combine such a height adjuster with a tightening means associated with the retractor and disposed beneath the height adjuster, in particular on the B column of the vehicle. Since the tightening must take place within a very short period of time correspondingly high forces occur at the upper deflection fitting which result in a downward movement with a high acceleration of the guide-piece or slide holding said deflection fitting in its rail. This downward movement takes place so quickly that the pawl cannot come into engagement with the associated detent openings of the locking rail. The known height adjuster is thus not functionable in conjunction with a tightening means.

The present invention provides a safety belt restraining system for vehicle occupants having a tigtening means and a height adjuster for the upper deflection fitting of the shoulder belt, and which operates satisfactorily even on activation of the tightening means.

The safety belt restraining system according to the invention is the first to permit the combination of a tightening means with a height adjuster for the upper deflection fitting of the shoulder belt. On activation of the tightening means at the upper deflection fitting a high tensile stress directed downwardly towards the safety belt retractor occurs by which a turning moment is imparted to the detent lever which positively forces said lever to engage into the next available detent opening. This torque or turning moment is generated by the tightening force directed downwardly towards the safety belt retractor which engages on a lever which is defined by the magnitude of the offsetting of the pivot axis of the detent lever with respect to the engagement point of the deflection fitting.

According to a particular embodiment of the invention the height adjuster is coupled in constrained manner via a pulling cable to the longitudinal adjustment mechanism of the associated vehicle seat. To avoid impairing the pivotabililty of the detent lever the pulling cable does not engage on the detent lever but on the slide. If the pulling cable engaged on the detent lever on activation of the tightening means an upwardly directed tensile stress on the detent lever would result which would be opposite to the downwardly directed force component of the tensile force acting at the engagement point of the deflection fitting and thus would reduce the turning moment for pivoting the detent lever into engagement with the detent openings.

Further advantages and features of the invention will be apparent from the following description of a preferred embodiment made with the aid of the drawings, wherein:

FIG. 1 is a schematic side elevation of a safety belt restraining system for vehicle occupants with tightening means and height adjuster for the upper deflection fitting of the shoulder belt;

FIG. 2 is a schematic longitudinal sectional view of a known height adjuster;

FIG. 3 is a schematic longitudinal sectional view of a height adjuster for the safety belt restraining system according to the invention and FIG. 4 is an exploded detail view of the slide with detent lever in the height adjuster of FIG. 3.

The safety belt restraining system is associated with a longitudinally adjustable vehicle seat 10. The vehicle seat 10 is longitudinally displaceable in known manner on a chassis-fixed guide member 12 and adapted to be arrested in the various longitudinal positions. The waist belt 14 extends between a chassis- fixed anchoring fitting 16 and a lock fitting 17 whose insertion tongue is inserted into a belt lock 18 secured to the vehicle seat 10. The shoulder belt 20 runs between the lock fitting 17 and an upper deflection fitting 22. Said fitting 22 is constructed as vertically or height adjustable guide fitting. Details of the height adjuster provided for vertical adjustment and designated in FIG. 1 generally by 24 can be seen in FIGS. 2 to 4. The height adjuster 24 is coupled via a pulling cable 26 to the vehicle seat 10. The pulling cable 26A engages at its one end on the height adjuster 24 and at its other end, which is led over a chassis-fixed guide roller 28, engages via a tension spring 30 on the vehicle seat 10. The safety belt restraining system further includes a safety belt retractor 32 comprising an automatic blocking device. Such a safety belt retractor is well known and will therefore not be described in detail. It is equipped with a tightening means 32A likewise known per se and secured at the bottom to the B column of the vehicle.

The height adjuster shown in FIG. 2 consists of a vertical rail 40 which is anchored to the B column of the vehicle and which is generally C-shaped in cross-section and forms in its interior a guide channel, and a slide 42 which is displaceable in said guide channel and consists of two plastic shells assembled together in which a detent lever 44 is mounted. Secured to the detent lever 44 is a bolt 46 for the upper anchoring fitting 22. Above the bolt 46 the upper end of the pulling cable 26A engages the detent lever 44. Said upper end of the pulling cable 26A is guided via a guide roller 48 which is rotatably mounted on an upper mounting extension 40A of the rail 40. The detent lever 44 comprises an upper extension 44A on the inner side of which a pressure spring 50 bears with its one end, the other end of which bears on the opposite inner face of the slide 42. At the lower end of the slide 42 a compensating spring 52 engages which is formed as roll spring and consists of a spirally coiled spring band. The rail 40 comprises in its wall lying in the travelling direction detent openings 54 which are spaced apart in the longitudinal direction and into which the detent nose 56 of the detent lever 44 can selectively drop. By the pressure spring 50 the detent nose 56 is held out of engagement with the detent openings 54. Under load, i.e. when via the upper anchoring fitting 22 and the bolt 46 a tensile force directed corresponding to the path of the upper portion of the shoulder belt 20 is exerted on the detent lever 44, said force can be broken down into a horizontal component directed in the direction of travel and a component directed vertically downwardly. These two force components are indicated in FIG. 2 by the arrows $F_H$ and $F_V$. By the force component $F_V$ the detent lever 44 is moved downwardly; by the force component $F_H$ the detent lever 44 is simultaneously shifted in the travelling direction so that its detent nose 46 drops into the next available detent opening 54. To avoid excessive strain on the pulling cable 26A the tension spring 30 (FIG. 1) is provided which moreover holds the pulling cable 26 taut.

The height adjuster shown in FIG. 2 is not suitable for combination with a tightening means. On activation of the tightening means 32A (FIG. 1) the belt spool of the safety belt retractor 32 is suddenly turned in the takeup direction and as a result via the webbing portion 21 extending between the safety belt retractor 32 and the upper anchoring fitting 22 on the shoulder belt 20 and the waist belt 14 are tightened round the vehicle occupant. At the upper anchoring fitting 22 a predominantly downwardly directed tensile force acts which engages via the bolt 46 on the detent lever 44. Since the tightening takes place at the start of an accident process, i.e. a forward displacement of the vehicle occupant has not yet taken place, the force component $F_H$ (FIG. 2) pointing in the travelling direction is not available to move the detent nose 56 into engagement with the nearest detent opening 54.

The detent lever 44 is thus moved on activation of the tightening means 32A with the slider 42 abruptly into its lowermost end position in the rail 40.

This undesired downward movement of the detent lever 44 on activation of the tightening means is avoided by the construction of the height adjuster shown in FIGS. 3 and 4.

Since for reasons of simplicity and economic mass production the height adjuster according to FIGS. 3 and 4 is substantially identical to the height adjuster according to FIG. 2, only the differences will be described in detail.

The detent lever 44 is pivotally mounted about a pivot axis 60, that is physically the pivot pin 62, in the slide 42 formed from two assembled plastic shells 42A, 42B. The pivot pin 62 extends through a bearing opening 64 of the detent lever 44. The bearing pin 62 can be integrally formed on the plastic shell 62A or inserted as steel pin into an opening thereof. In the plastic shell 42B a bearing opening 66 aligns with the bearing pin 62. The upper end of the pulling cable 26A does not engage the detent lever 44 but the slide 42. For this purpose the plastic shell 42B has a hooklike lug 68 to which the pulling cable 26A is attached. The bolt 46 secured to the detent lever 44 extends through an elongated opening 70 in the plastic shell 42B. The pressure spring 50 is received in two complementary approximately semicylindrical recesses 72, 74 in the plastic shells 42A, 42B.

It is apparent from FIG. 3 that the pivot axis 60 is offset forwardly in the travelling direction and upwardly with respect to the axis of the bolt 46. The magnitude of the forward offsetting in the travelling direction is designated in FIG. 3 by a. This amount a corresponds to a lever arm whose one end is defined by the vertical projection of the pivot axis 60 and whose other end is defined by the vertical projection of the axis of the bolt 46. On activation of the tightening means 32A (FIG. 1) a high vertically downwardly directed force acts on the bolt 46. Since this force acts simultaneously on the end of the lever of length a defined by the axis of the bolt 46 a turning moment is imparted on the detent lever 44 about the pivot axis 60 thereof. This turning moment results in a pivoting of the detent lever 44 in the clockwise direction in FIG. 3 and as a result the detent nose 56 is driven into the next available detent opening 54 in the rail 40. With the design-inherent dimensions of the vertical adjuster a magnitude a of the offsetting of about 7 to 15 mm, preferably about 10 mm, can easily be achieved and this gives adequate turning moment for the necessary pivot motion of the detent lever 44.

The pivot axis 60 is vertically upwardly offset with respect to the axis of the bolt 46 by the amount b. Said amount b is of significance primarily for the pivot motion of the detent lever 44 into the engagement position under the action of the horizontal force component $F_H$ (FIG. 2). Even when no activation of the tightening means takes place the detent nose 56 of the detent lever 44 must drop into the next available detent opening 54 when the safety belt is stressed by forward displacement of the vehicle occupant. The horizontal forwardly directed force component $F_H$ (FIG. 2) then generates a turning moment in the clockwise direction about the pivot axis 60 with a leverage of length b. This turning moment causes the detent nose 56 of the detent lever 44 to be pivoted into engagement with the next available detent opening 54.

In FIG. 3 the detent lever 44 is illustrated with full lines in its rest position in which it is held by the pressure spring 50. In dashed lines in FIG. 3 the position of the detent lever 44 is shown into which it is moved by combined downward and pivot motion starting from the rest position illustrated. The detent nose 56 has dropped into the next available detent opening 54.

In the embodiment described the vertical adjuster 24 is coupled in constrained manner to the longitudinal adjustment of the vehicle seat 10. In another embodiment which is not shown in detail there is associated with the height adjuster an actuator drive which by a suitable operating and programming mechanism is controlled so that the suitable height is always set.

I claim:

1. Safety belt restraining system for vehicle occupants wherein:
   (a) a safety belt retractor with automatic blocking means comprises a tightening means for tightening the belt webbing in an accident situation;
   (b) a safety belt has a shoulder web section extending upwardly to a deflection fitting and web section extending downwardly from said deflection fitting to said retractor;

(c) a height adjuster is provided for said deflection fitting, said height adjuster comprising a substantially vertically extending rail which is secured to a vehicle body portion and has a row of spaced-apart detent openings, a slide adjustable in the rail, and a detent lever which is pivotally mounted on the slide and whereon the deflection fitting is mounted at a mounting location, said detent lever having a detent nose which is selectively movable into one of the detent openings against a spring bias tending to maintain said detent nose out of engagement with the detent openings;

(d) said pivotally mounted detent lever having a pivot axis which is offset in the direction of normal forward vehicle travel and upwardly with respect to said mounting location of the deflection fitting.

2. Safety belt restraining system according to claim 1, wherein an adjusting means engaging the slide is provided for the height adjustment of the deflection fitting.

3. Safety belt restraining system according to claim 2, wherein the adjusting means comprises a cable mechanism with a pulling cable which has one of its ends secured to the slide and its other end to an actuator drive.

4. Safety belt restraining system according to claim 1, wherein said pivot axis is offset with respect to the mounting location of the deflection fitting in the vehicle forward travel direction by an amount which is about 7 to 15 mm, preferably about 10 mm.

5. Safety belt restraining system according to claim 1, wherein said pivot axis is offset upwardly with respect to the mounting location of the deflection fitting by an amount of about 20 mm.

6. A safety belt restraining system for a vehicle occupant comprising:

a safety belt retractor with automatic belt locking means and tightening means for tightening said belt in an accident situation;

a safety belt having a shoulder web section extending upwardly to a deflection fitting and a web section extending downwardly from said deflection fitting to said retractor; and a height adjuster for said deflection fitting, said height adjuster comprising a substantially vertically extending rail secured to a vehicle body portion and having a row of spaced-apart detent openings;

a slide adjustable in said rail;

a detent lever pivotally mounted on said slide, said deflection fitting being mounted on said detent lever at a mounting location, said detent lever having a detent nose which is selectively movable into one of said detent openings against a spring bias tending to maintain said detent nose out of engagement with said detent openings, said pivotally mounted detent lever having a pivot axis which is offset in the direction of normal forward vehicle travel and upwardly with respect to said mounting location of said deflection fitting;

adjusting means engaging said slide for adjusting the height of said deflection fitting, said adjusting means comprising a cable mechanism including a pulling cable having one end secured to said slide and another end secured to an actuator drive, said pulling cable extending about a guide roller disposed at the upper end of said rail, and a compensating spring biasing said slide downwardly oppositely to the pulling direction of said pulling cable.

7. A safety belt restraining system for a vehicle occupant comprising:

a safety belt retractor with automatic belt locking means and tightening means for tightening said belt in an accident situation;

a safety belt having a shoulder web section extending upwardly to a deflection fitting and a web section extending downwardly from said deflection fitting to said retractor; and a height adjuster for said deflector fitting, said height adjuster comprising a substantially vertically extending rail secured to a vehicle body portion and having a row of spaced-apart detent openings;

a slide adjustable in said rail;

a detent lever pivotally mounted on said slide, said deflection fitting being mounted on said detent lever at a mounting location, said detent lever having a detent nose which is selectively movable into one of said detent openings against a spring bias tending to maintain said detent nose out of engagement with said detent openings, said pivotally mounted detent lever having a pivot axis which is offset in the direction of normal forward vehicle travel and upwardly with respect to said mounting location of said deflection fitting;

adjusting means engaging said slide for adjusting the height of said deflection fitting, said adjusting means comprising a cable mechanism including a pulling cable having one end secured to said slide and another end secured to an actuator drive, said actuator drive being derived from a longitudinal adjusting means of a vehicle seat associated with the restraining system.

8. A safety belt restraining system according to claim 7 wherein said pulling cable extends about a guide roller rotatably mounted on the vehicle body.

9. A safety belt restraining system according to claim 7 wherein said pulling cable is secured via a tension spring to the longitudinally adjustable vehicle seat.

10. A safety belt restraining system for a vehicle occupant comprising:

a safety belt retractor with automatic belt locking means and tightening means for tightening said belt in an accident situation;

a deflection fitting;

a safety belt having a shoulder web section for extending upwardly to said deflection fitting and a web section for extending downwardly from said deflection fitting to said retractor; and a height adjuster for said deflection fitting, said height adjuster comprising a rail for mounting to a vehicle body portion in a vertically extending orientation and having a row of spaced-apart detent openings;

a slide adjustable in said rail; and a detent lever pivotally mounted on said slide, said detent lever having a detent nose, a spring biasing said detent lever and said detent nose out of engagement with said detent openings, said detent nose being selectively movable into one of said detent openings against the spring bias tending to maintain said detent nose out of engagement with said detent openings, said deflection fitting being mounted at a mounting location on said detent lever;

said pivotally mounted detent lever having a pivot axis to be offset in the direction of normal forward vehicle travel and upwardly relative to said mounting location of said deflection fitting;

said tightening means acting at said mounting location to effect tightening of said belt and pivoting of said detent lever about said pivot axis to bring said detent nose into engagement with one of said detent openings.

* * * * *